United States Patent [19]

Robinson et al.

[11] Patent Number: 4,577,009
[45] Date of Patent: Mar. 18, 1986

[54] POLYIMIDE PRODUCT FROM PHENANTHRENE

[75] Inventors: Joseph G. Robinson, Winchcombe; Pierce W. F. Riemer, Huntly, both of England

[73] Assignee: Coal Industry (Patents) Limited, London, England

[21] Appl. No.: 651,713

[22] Filed: Sep. 18, 1984

[30] Foreign Application Priority Data

Nov. 18, 1983 [GB] United Kingdom ............... 8330793

[51] Int. Cl.⁴ .............................................. C08G 10/04
[52] U.S. Cl. ..................................... 528/228; 528/229
[58] Field of Search ................................ 528/228, 229

[56] References Cited

U.S. PATENT DOCUMENTS 4,346,212  8/1982  Robinson et al. ................... 528/229
4,394,499  7/1983  Robinson et al. ................... 528/229

Primary Examiner—Harold D. Anderson
Attorney, Agent, or Firm—Stevens, Davis, Miller & Mosher

[57] ABSTRACT

Novel polyimide products of the general formula

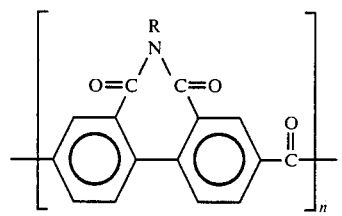

where n is from 2 to 20 and each R is hydrogen or a group effective to block further reaction with a diamine. These products are incapable of further polymerization with diamines, but are useful starting materials for reaction with other polyfunctional reagents such as diepoxides to form interesting new resins.

2 Claims, 1 Drawing Figure

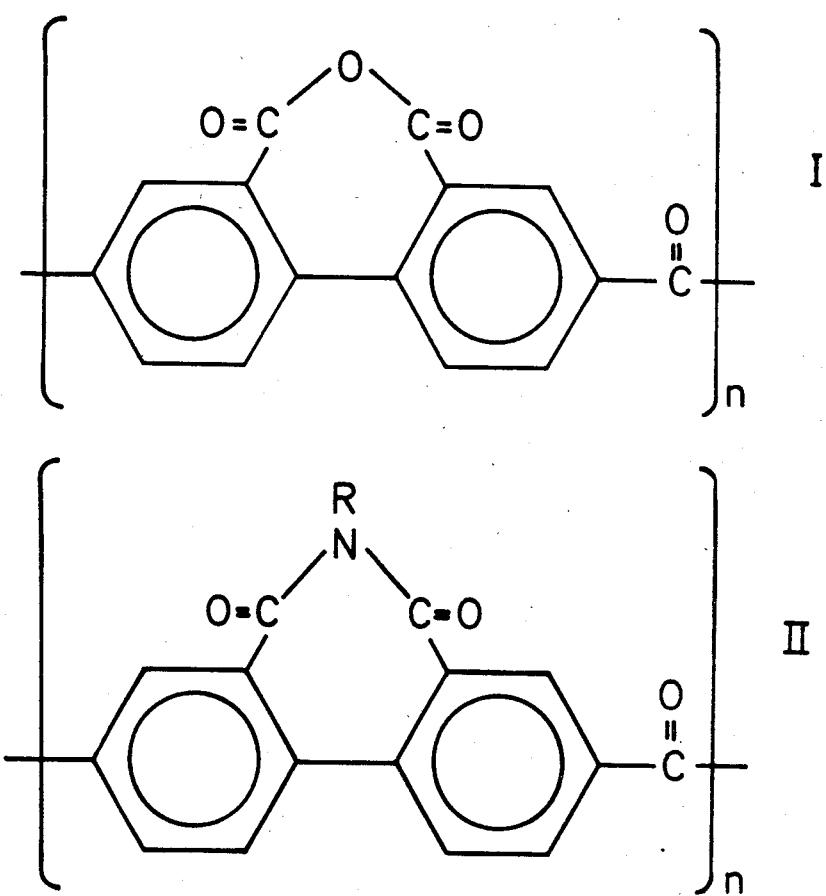

POLYIMIDE PRODUCT FROM PHENANTHRENE

This invention concerns improved polyimide products, and resins produced from time, especially those polyimide products and resins derived from phenanthrene.

Our co-pending published British Patent Application, Nos. 2,064,564A and 2,082,610A, describe the general chemistry for the preparation of polyimide resins from phenanthrene; these resins have been found to exhibit interesting high temperature properties. In these prior-published applications there is disclosed an intermediate of the production of polymides, conveniently described as the anhydride derivative of the general formula I, where n lies in the range 2 to 20. Published application No. 2,082,610A describes the reaction of the anhydride derivative with 0.1 to 0.6 of an equivalent quantity of an aromatic primary diamine, the remaining anhydride groups being reacted with a monofunctional amine or ammonia. The resulting product is a polyimide having a controlled density of cross-linking, and may thus be less brittle than highly cross-linked polyimide resins.

We have now discussed that the anhydride derivative may be used to produce a novel polyimide product which itself enables the production of a wide variety of resins hitherto not suggested.

The invention provides a polyimide product of the general formula II, where n is as hereinbefore defined and each R is hydrogen or a group effective to block further reaction with a diamine. The polyimide product is prepared according to the invention by the reaction of the anhydride derivation of formula I with an equivalent amount of ammonia and/or an amino compound effective to block further reaction of the polyimide product with a diamine.

The reaction is suitably carried out by dissolving the anhydride derivative in a dry solvent, especially a high boiling solvent such as dimethyl formamide or dimethyl sulphoxide and adding ammonia as NH4 OH solution or as a compound which releases ammonia, such as urea or ammonium carbamate, or a suitable form of an amino compounds, such as hydrazine, hydroxylamine or aliphatic or aromatic primary amine, which has the same effect of blocking further reaction of the imido group with diamines but not necessarily with other reagents.

Since the utility of the novel polyimide product of formula II is as a starting material for resinification, the group R may be any which confers desirable properties in the eventual resin product, and may be reactive or not with monomers. However, R is preferably hydrogen. The reaction mixture is suitably heated with stirring until imidisation is complete, whereupon the pressure is reduced and the reaction mixture heated further to facilitate removal of solvent.

The novel polyimide product is blocked to any further reaction with diamines as taught in our previous applications. However, where R is a hydrogen atom, it is activated and may be used to react the polyimide product with a wide variety of reagents to form novel polymers ranging from linear to totally cross-linked materials. Suitable reagents include poly-functional compounds such as diepoxides, diisocyanates, diacid chlorides, and other compounds which are capable of reacting with the hydrogen of the imido group or other part of group R. The quantity of reagents used may vary to give from 5 to 100% reaction of the imido groups, according to the desired properties of the resulting polymer. For example, a linear, thermoplastic resin may result from the reaction of approximately 50% of the imide groups with a di-functional compound when n=2 in the polyimide of the general formula II.

Accordingly, the invention also provides resins which are the products of reaction of 5% to 100% of the imido groups of the polyimide of formula II, with a poly-functional reactant.

Conventional reaction conditions for the reactions may be used and these will depend upon the reactant chosen and the product desired. In view of the field opened up by the choice of the polyimides of formula II as feedstock, however, the particular reaction conditions are best chosen by experiment.

It is thought that the presence of unreacted imide groups may increase the adhesion of the product resins to many substrates though further reaction and/or hydrogen bonding.

Chain termination may be achieved in known manner, for example by hydrolysis, amide group formation or substitution or may not be necessary according to the quantity and/or type of polyfunctional reactant.

The invention will now be illustrated by way of example only.

EXAMPLE 4.5 g of the polyanhydride of FIG. 1 (n=2) was dissolved in 15 g of dry dimethyl sulphoxide. To this solution was added 4 g of ammonium hydroxide (density 0.88) and the mixture was heated at 70° C. for 4 hours, with stirring. At the end of this time a further 4 g of ammonium hydroxide was added and the process was repeated. The temperature was thereafter raised to 130° C. for 1 hour and the pressure reduced to 5 mm Hg, and the solvent was removed by distillation. The solid remaining was purified in conventional manner and found to be of general formula II (n=2, R=H).

The above procedure was repeated using urea, and the same product was produced.

The product of general formula II was found to be a useful starting material for resinification; resins of interesting properties could be obtained in initial tests with terephthaloyl dichloride.

We claim:

1. A polyimide product of the general formula

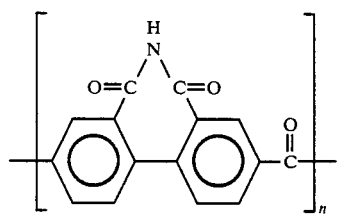

where n is a value in the range 2 to 20.

2. The polyimide product as claimed in claim 1, wherein n is a value in the range 2 to 5.

* * * * *